3,252,934
COMPOSITIONS CONTAINING POLYMERS OF ETHYLENE, COPOLYMERS OF ACRYLONITRILE AND AN ALKENYL AROMATIC MONOMER, AND A TRIALKYLPHENOL
Austin L. Jankens, Bay City, Mich., assignor to The Dow Chemical Company, Midland, Mich., a corporation of Delaware
No Drawing. Filed Nov. 24, 1961, Ser. No. 154,856
7 Claims. (Cl. 260—33.4)

This invention relates to new compositions of matter. More particularly, this invention relates to compositions comprising polymers of ethylene.

Polyethylene, which is otherwise desirable for the manufacture of shaped articles of relatively light weight, having excellent flexibility over a wide range of temperatures and exhibiting chemical inertness toward aqueous and non-aqueous liquids, has been found deficient in that shaped articles manufactured therefrom are susceptible to environmental stress cracking. That is, shaped polyethylene articles have a tendency to crack and rupture when subjected to stress in the presence of certain environments.

Shaped articles manufactured from polyethylene normally contain internal strains which are produced in the article during the forming operation as, for example, the molding or extrusion operation and also during any subsequent operation on the shaped articles, such as a stretching or machining operation. These internal strains in themselves are often sufficient to cause the shaped article to crack and rupture without being subjected to external stress. Generally, however, cracking and rupturing most often occurs when the shaped polyethylene is subjected to a stress, for example, a bending or other such deformation in the presence of certain environments. As an illustration, cracking and rupturing of polyethylene articles has been found to occur in those applications wherein the shaped article is subjected to a stress in the presence of surface active agents, such as soaps and detergents; also in the presence of alcohols, polyglycol ethers, silicon fluids and various other aliphatic and aromatic hydrocarbons.

Environmental stress cracking has been reported as occurring in the wire and cable industry whenever polyethylene cables are lubricated with soaps or detergents prior to being pulled through conduits. The packaging industry has also reported the failure of polyethylene or polyethylene coated containers as the packaging means for surface active agents due to cracking and rupturing. In addition, polyethylene piping and tubing have been found to crack while under stress when in contact with a surface active agent.

Stress cracking is particularly undesirable as it severely shortens the useful life of the polyethylene article. An article once cracked and ruptured is, for all practical purposes, rendered useless.

It is among the objects of the present invention to provide a new composition of matter suitable for use in the manufacture of shaped articles.

A further object of the present invention is the provision of such a polymer composition which has increased resistance to environmental stress cracking.

It is another object of the present invention to provide blends of synthetic resins which are resistant to environmental stress cracking and which have other properties making it particularly suitable for use in the fabrication of flexible containers.

It is a more particular object of the present invention to provide plastic compositions that can be easily shaped and that have such strength, rigidity, dimensional stability and stress-crack resistance that they are especially suitable for use as structural materials in making detergent bottles as well as other shaped articles.

These and other objects and advantages are obtained from the practice of the present invention as will become more clearly apparent.

According to the present invention, compositions comprising polyethylene, a certain alkenyl aromatic copolymer and a small amount of certain 2,4,6-trialkylphenols are particularly suitable for the manufacture of shaped articles of good strength, rigidity, and high resistance to stress cracking. The polyethylene can be of the low, intermediate or high density varieties having densities ranging from about 0.90 to about 0.97. Instead of polyethylene or in addition thereto, solid ethylene/1-olefin copolymers in the same general density range can be utilized in the practice of this invention. The ethylene/1-olefin copolymers suitable for use in the compositions of this invention are copolymers of ethylene with up to about 10, and especially with up to about 6, percent by weight of the 1-olefin, such as copolymers of from about 90 percent to about 99.9 percent ethylene and from about 0.1 percent to about 10 percent 1-olefin by weight and especially from about 94 percent to about 99 percent ethylene and from about 1 percent to about 6 percent 1-olefin by weight. The 1-olefins, sometimes called alpha-olefins, which are copolymerized with ethylene to produce the polymers employed in this invention are 1-olefins having from 3 to 8 carbon atoms representative examples of which are propylene, 1-butene, 1-pentene, 2-ethyl-1-hexene and 1-octene.

The alkenyl aromatic polymers above referred to which are combined with polyethylene and/or the ethylene/1-olefin copolymers are solid resinous copolymers of acrylonitrile with monoalkenyl aromatic monomers of the formula $CH_2=CRAr$ where R is selected from the group consisting of hydrogen and methyl and Ar is an aromatic radical of the benzene series containing from 6 to about 10 carbon atoms. Such copolymers can contain from 1 percent to 99 percent of alkenyl aromatic monomer and from 1 percent to 99 percent of acrylonitrile. Usually copolymers containing from about 67 to about 75 percent by weight of an alkenyl aromatic monomer and from about 25 to about 33 percent by weight of acrylonitrile are employed.

Representative specific examples of aromatic monomers that can be copolymerized with acrylonitrile to form polymers which can be employed in the compositions of this invention are styrene, paramethylstyrene, orthovinyltoluene, metaethylstyrene, isopropylstyrene, orthomethylparaisopropylstyrene, vinyl naphthalene and alphamethylstyrene. Representative illustrative examples of copolymers of alkenyl aromatics with acrylonitrile are a copolymer of styrene and acrylonitrile, a copolymer of alphamethylstyrene and acrylonitrile, a copolymer of acrylonitrile and orthovinyltoluene and a copolymer of acrylonitrile and vinyl naphthalene. Any of the alkenyl aromatic monomers of the character mentioned above and mixtures thereof can be copolymerized with acrylonitrile to form polymers useable in this invention.

The composition of the present invention can contain about 88 percent to about 99.5 percent by weight of the polyethylene and/or ethylene/1-olefin copolymer and from about 0.5 percent to about 12 percent by weight of an alkenyl aromatic/acrylonitrile copolymer. It is found that composition containing between about 94 and 98 percent of polyethylene or the ethylene/1-olefin copolymer and between about 2 and 6 percent by weight of alkenyl aromatic/acrylonitrile copolymer are particularly desirable.

It is essential to the practice of the present invention that the composition contain a small amount up to about 1 percent by weight based on the total polymers of a 2,4,6-trialkylphenol. The amount of 2,4,6-trialkylphenol employed can vary from as little as about 0.001 percent by weight based on the combined weight of olefin polymer and the alkenyl aromatic polymer in the composition to as much as 1 percent or more by weight on the same basis.

Trialkylphenols which can be utilized in the present invention are the 2,4,6-trialkylated monohydroxy phenols having at least four carbon atoms in the alkyl groups ortho to the hydroxyl group, and from 1 to 4 carbon atoms in the alkyl group para to the hydroxyl group. Exemplary of this class of trialkylphenols are 2,6-di-tert.-butyl-p-cresol, 2,6-di-tert.-amyl-p-cresol, 2,4,6-tri-tert.-butyl-phenol, 2,6-di-tert.-butyl-4-ethylphenol and so forth.

The method by which the compositions are made is not particularly critical and can be accomplished in any convenient manner. For example, the component polymers and the trialkylphenol can be mixed together in any convenient order in an internal mixer, such as a mixing extruder or a Banbury mixer, or on an external mixer such as a roll mill. If desired, a portion of the mixing sequence can be combined with the shaping or forming operation as, for example, by accomplishing the final mixing in the barrel of the forming extruder or in the cylinder of the injection molding machine.

Throughout the specification, parts and percentages are parts and percentages by weight unless otherwise stated. The following examples illustrate the invention but the invention is not limited thereto.

*Example I*

A batch is prepared by dry mixing 95 parts of pelletized copolymer of 99 percent ethylene with 1 percent 1-butene and having a density of 0.946 gram per cubic centimeter, and a melt index of 0.2, with 5 parts of granules of a copolymer of 71 percent styrene and 29 percent acrylonitrile, and a molecular weight of 180,000 (determined according to Fikentscher using a 10 percent solution in methylethyl ketone) and 0.1 part of 2,6-di-tert.-butyl-p-cresol. The mixture is passed twice through a mixing extruder to obtain an intimate, homogenous blend of the copolymers and 2,6-di-tert.-butyl-p-cresol. This blend, when tested for susceptibility to environmental stress cracking in accordance with the procedure given in ASTM D 1693–59T, using a condensate of p-nonylphenol and 9 moles of ethylene oxide, has an F–50 value of 235 hours.

The blend, in addition to being especially suitable for use in the fabrication of detergent bottles, can be made into films, filaments, tubes, rods, sheets and other shaped articles by molding, extrusion, calendering and the like conventional techniques using standard equipment.

For control purposes, a pelletized sample of the ethylene/1-butene copolymer used in Example I is passed twice through the extruder and tested in the manner described for the blend. This material has an F–50 value of 29 hours. For purposes of contrast, 95 parts of a sample of the ethylene/1-butene copolymer used in Example I is dry blended with 0.1 part of 2,6-di-tert.-butyl-p-cresol and twice passed through the extruder and tested for stress-crack resistance in the manner described for the tertiary blend. This material has an F–50 value of 25 hours. For purposes of further contrast, a blend is made in the manner described in Example I of the polymers used therein but omitting the 2,6-di-tert.-butyl-p-cresol. This blend has an F–50 value of 66 hours.

Experience has indicated that different lots of what is otherwise regarded as being substantially the same olefin polymer, made from similar raw materials and the same equipment and conditions may have widely varying F–50 values. To test the efficacy of the addition and intimate blending of styrene/acrylonitrile copolymer and 2,6-di-tert.-butyl-p-cresol with different runs of olefin polymers on the F–50 value, lots were obtained of a copolymer of ethylene and 1-butene having a density of 0.946 gram per cubic centimeter and a melt index of 0.2 but, as indicated below, differing F–50 values. Blends were made and tests run in the manner set forth in Example I. In every instance, at least some improvement in F–50 value is obtained by the blending of the olefin polymer with the copolymer of styrene and acrylonitrile alone or with the 2,6-di-tert.-butyl-p-cresol alone. As can be seen, however, when the 2,6-di-tert.-butyl-p-cresol and the styrene/acrylonitrile copolymer are blended together in combination with the olefin copolymer a very substantial and disproportionate increase in F–50 value is obtained. In each of the examples which follow, 95 parts by weight of the olefin polymer is used.

| Olefin polymer lot number | Styrene/acrylonitrile polymer (parts) | 2,6-di-tert.-butyl-p-cresol (parts) | F–50 value (hours) |
|---|---|---|---|
| 2 | 0 | 0 | 9 |
| 2 | 5 | 0 | 14 |
| 2 | 0 | 0.1 | 16.5 |
| 2 | 5 | 0.1 | 86 |
| 3 | 0 | 0 | 22 |
| 3 | 5 | 0 | 31 |
| 3 | 0 | 0.1 | 22.5 |
| 3 | 5 | 0.1 | 79 |
| 4 | 0 | 0 | 15 |
| 4 | 5 | 0 | 35 |
| 4 | 0 | 0.1 | 25 |
| 4 | 5 | 0.1 | 62 |

*Example II*

In a manner similar to Example 1, 5 parts of a copolymer of styrene and acrylonitrile, 71 percent by weight styrene and 29 percent by weight acrylonitrile and having a molecular weight of 180,000 (calculated by the method of Fikentscher using a 10 percent solution of the polymer in methyl ethyl ketone) is blended with 95 parts of an ethylene/1-octene copolymer, 99 percent by weight of ethylene and 1 percent by weight of 1-octene melt index of 0.9 and a density of 0.945 and 0.1 part of 2,6-di-tert.-butyl-p-cresol. This composition has an F–50 value when tested in the manner set forth in Example I of 67. By way of contrast, the ethylene copolymer used in this example when tested by itself has an F–50 value of 10.

*Example III*

Ninety-five parts of a copolymer of 99 percent ethylene and 1 percent 1-butene having a density of about 0.946 and a melt index of 0.25 is blended in a Banbury mixer with 5 parts of a copolymer of 72 percent orthovinyltoluene and 28 percent acrylonitrile (a 10 percent solution of which copolymer in methyl ethyl ketone has a viscosity at 25° C. of 8 centipoises) and 0.1 part of 2,6-di-tert.-butyl-p-cresol. An F–50 value of 750 is obtained with this composition using the ASTM method herein referred to. In contrast to this example, the ethylene copolymer alone has an F–50 value of 40.

Similar improved results are obtained when using compositions of polyethylene and/or copolymers of ethylene and 1-olefins within the monomer ratio given above, with copolymers of an alkenyl aromatic of the class herein defined with acrylonitrile and with the 2,4,6-trialkyl phenol provided the percentages of the ethylene polymer, the alkenyl aromatic/acrylonitrile polymer and the 2,4,6-trialkyl phenol used in the blend are in accordance with the teachings herein contained.

A further discovery made in connection with improving the stress-crack resistance and other properties of olefin polymers of the type described above is that when the olefin polymer has an initial F–50 value in excess of about 30, one is not restricted to alkenyl aromatic copolymers of acrylonitrile as herein defined. More particularly, one can utilize polymers composed entirely of alkenyl aromatic monomers of the formula $CH_2=CRAr$, wherein R is hydrogen or methyl and Ar is an aromatic radical of the benzene series containing from 6 to 10 carbon atoms, for example polystyrene, polyalphamethylstyrene, polyvinylnaphthalene and copolymers of styrene and alphamethylstyrene. There can also be employed the product obtained by polymerizing a solution of rubbery copolymers of styrene and butadiene in styrene. In addition, polymers such as the copolymers of styrene and methylmethacrylate and polymethylmethacrylate can effectively be utilized.

The compositions of this invention, in addition to the very substantial increase in environmental stress-crack resistance have increased tensile strengths and increased moduli of elasticity without the disadvantage of lowered heat distortion temperatures.

The material of the present invention can be used without the addition of other materials or there can be mixed therewith, dyes, delusterants, pigments, lubricants, antistatic agents, preservatives, fillers and the like. The compositions can be fabricated into a variety of articles such as films, sheets, rods, conduits, containers and the like by conventional shaping techniques, including injection molding, blow molding, compression molding, calendering and extrusion.

That which is claimed is:

1. A composition of matter consisting essentially of from about 88 percent to about 99.5 percent by weight of a solid olefin polymer selected from the group consisting of polyethylene and copolymers of ethylene with up to about 10 percent by weight 1-olefin having from 3 to 8 carbon atoms and mixtures of polyethylene and copolymers of ethylene, from about 0.5 to about 12 percent by weight of a copolymer of acrylonitrile with an alkenyl aromatic monomer of the formula $CH_2=CRAr$ in which R is selected from the group consisting of hydrogen and methyl and Ar is an aromatic radical of the benzene series containing from 6 to 10 carbon atoms, said copolymer containing a major proportion by weight of the alkenyl aromatic monomer and a minor proportion by weight of acrylonitrile, and up to about 1 percent by weight, based on the combined weight of the olefin polymer and the acrylonitrile-alkenyl aromatic copolymer of a 2,4,6-trialkylated monohydroxy phenol having at least 4 carbon atoms in the alkyl groups ortho to the hydroxyl group, and from 1 to 4 carbon atoms in the alkyl group para to the hydroxyl group.

2. A composition of matter consisting essentially of from about 94 percent to about 98 percent by weight of a solid olefin polymer selected from the group consisting of polyethylene and copolymers of ethylene with up to about 10 percent by weight 1-olefin having from 3 to 8 carbon atoms and mixtures of polyethylene and copolymers of ethylene, from about 2 percent to about 6 percent by weight of a copolymer of acrylonitrile with an alkenyl aromatic monomer of the formula $CH_2=CRAr$ in which R is selected from the group consisting of hydrogen and methyl and Ar is an aromatic radical of the benzene series containing from 6 to 10 carbon atoms, said copolymer containing a major proportion by weight of the alkenyl aromatic monomer and a minor proportion by weight of acrylonitrile, and from about 0.01 percent to about 1 percent by weight, based on the combined weight of the olefin polymer and the acrylonitrile-alkenyl aromatic copolymer of a 2,4,6-trialkylated monohydroxy phenol having at least 4 carbon atoms in the alkyl groups ortho to the hydroxy group, and from 1 to 4 carbon atoms in the alkyl group para to the hydroxyl group.

3. A composition of matter consisting essentially of from about 88 percent to about 99.5 percent by weight of a solid olefin polymer selected from the group consisting of polyethylene and copolymers of ethylene with up to about 6 percent by weight 1-olefin having from 3 to 8 carbon atoms and mixtures of polyethylene and copolymers of ethylene, from about 0.5 to about 12 percent by weight of a copolymer of acrylonitrile with an alkenyl aromatic monomer of the formula $CH_2=CRAr$ in which R is selected from the group consisting of hydrogen and methyl and Ar is an aromatic radical of the benzene series containing from 6 to 10 carbon atoms, said copolymer containing a major proportion by weight of the alkenyl aromatic monomer and a minor proportion by weight of acrylonitrile, and from about 0.01 percent to about 1 percent by weight, based on the combined weight of the olefin polymer and the acrylonitrile-alkenyl aromatic copolymer of a 2,4,6-trialkylated monohydroxy phenol having at least 4 carbon atoms in the alkyl groups ortho to the hydroxyl group, and from 1 to 4 carbon atoms in the alkyl group para to the hydroxyl group.

4. A composition of matter consisting essentially of from about 88 percent to about 99.5 percent by weight of a material selected from the group consisting of polyethylene and copolymers of ethylene and about 1 percent by weight 1-olefin having from 3 to 8 carbon atoms and mixtures of polyethylene and copolymers of ethylene, from about 0.5 to about 12 percent by weight of a copolymer of acrylonitrile with an alkenyl aromatic monomer of the formula $CH_2=CRAr$ in which R is selected from the group consisting of hydrogen and methyl and Ar is an aromatic radical of the benzene series containing from 6 to 10 carbon atoms, said copolymer containing a major proportion by weight of the alkenyl aromatic monomer and a minor proportion by weight of acrylonitrile, and from about 0.01 percent to about 1 percent by weight, based on the combined weight of the olefin polymer and the acrylonitrile-alkenyl aromatic copolymer of a 2,4,6-trialkylated monohydroxy phenol having at least 4 carbon atoms in the alkyl groups ortho to the hydroxyl group, and from 1 to 4 carbon atoms in the alkyl group para to the hydroxyl group.

5. A composition of matter consisting essentially of an intimate blend of from about 88 percent to about 99.5 percent by weight of a solid olefin polymer selected from the group consisting of polyethylene and copolymers of ethylene and up to about 10 percent by weight 1-olefin having from 3 to 8 carbon atoms and mixtures of polyethylene and copolymers of ethylene, from about 0.5 percent to about 12 percent by weight of a copolymer of about 67 percent to about 75 percent styrene and about 25 percent to about 33 percent by weight acrylonitrile and from about 0.01 percent to about 1 percent by weight, based on the combined weight of the olefin polymer and the styrene copolymer of a 2,4,6-trialkylated monohydroxy phenol having at least 4 carbon atoms in the alkyl groups ortho to the hydroxyl group, and from 1 to 4 carbon atoms in the alkyl group para to the hydroxyl group.

6. A composition of matter consisting essentially of from about 94 percent to about 98 percent by weight of a copolymer of between about 94 percent and 99 percent ethylene and between about 1 percent and about 6 percent by weight of 1-butene, from about 2 percent to about 6 percent by weight of a copolymer of acrylonitrile with an alkenyl aromatic monomer of the formula $CH_2=CRAr$ in which R is selected from the group consisting of hydrogen and methyl and Ar is an aromatic radical of the benzene series containing from 6 to 10 carbon atoms, said copolymer containing a major proportion by weight of the alkenyl aromatic monomer and a minor proportion by weight of acrylonitrile, and about 0.1 percent 2,6-di-tert.-butyl-p-cresol.

7. A composition of matter consisting essentially of from about 94 percent to about 98 percent by weight of a copolymer of between about 94 percent and 99 percent ethylene and between about 1 percent and about 6 percent by weight 1-butene, from about 2 percent to about 6 percent by weight of a copolymer of about 71 percent styrene and about 29 percent by weight acrylonitrile and about 0.1 percent 2,6-di-tert.-butyl-p-cresol.

References Cited by the Examiner

UNITED STATES PATENTS

| | | | |
|---|---|---|---|
| 2,655,492 | 10/1953 | Young | 260—45.5 |
| 2,956,035 | 10/1960 | Mock | 260—33.4 |
| 3,004,020 | 10/1961 | Young | 260—45.5 XR |

OTHER REFERENCES

Steiner: "Modified Styrenes for Structural Applications," Industrial and Engineering Chemistry, vol. 47, No. 7, July 1955, pages 1307–1311.

MORRIS LIEBMAN, *Primary Examiner*.

D. ERICKSON, B. A. AMERNICK, *Assistant Examiners*.